United States Patent
Blondin et al.

(10) Patent No.: US 12,210,712 B1
(45) Date of Patent: Jan. 28, 2025

(54) TOUCH SCREEN INCLUDING TOUCH ELECTRODES AND DISPLAY CIRCUITRY

(71) Applicant: Apple Inc., Cupertino, CA (US)

(72) Inventors: Christophe Blondin, Palo Alto, CA (US); Ashray Vinayak Gogte, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/470,858

(22) Filed: Sep. 20, 2023

Related U.S. Application Data

(60) Provisional application No. 63/376,576, filed on Sep. 21, 2022.

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0416* (2013.01)

(58) Field of Classification Search
CPC ..... G06F 3/0446; G06F 3/0412; G06F 3/0416
See application file for complete search history.

(56) References Cited

U.S. PATENT DOCUMENTS

| | | | |
|---|---|---|---|
| 10,025,130 | B2 | 7/2018 | Kim et al. |
| 2014/0210731 | A1* | 7/2014 | Parekh ................ G06F 3/04166 345/173 |
| 2015/0212624 | A1* | 7/2015 | Sohn ....................... G06F 3/044 345/174 |
| 2016/0139702 | A1* | 5/2016 | Franklin .................. H04R 5/04 345/174 |
| 2022/0236817 | A1* | 7/2022 | Kida ....................... G06F 3/044 |
| 2023/0004274 | A1* | 1/2023 | Shin ...................... G06F 3/0418 |

FOREIGN PATENT DOCUMENTS

| | | |
|---|---|---|
| CN | 104570447 B | 1/2018 |
| CN | 106227387 B | 1/2019 |

* cited by examiner

*Primary Examiner* — Afroza Chowdhury
(74) *Attorney, Agent, or Firm* — Kubota & Basol LLP

(57) ABSTRACT

In some examples, a touch screen can include touch sense electrodes coupled to touch sense circuitry and drive lines that couple display pixels to display circuitry. In some examples, the touch screen can include display lines oriented along a first axis (e.g., vertically) and display lines oriented along a second axis (e.g., horizontally) that is orthogonal to the first axis. In some examples, the touch screen can include touch sense electrodes oriented along the second axis at locations of display lines oriented along the first axis and touch sense electrodes oriented along the first axis at locations of display liens oriented along the second axis.

20 Claims, 7 Drawing Sheets

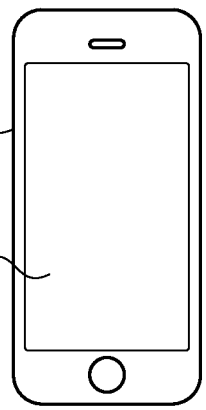
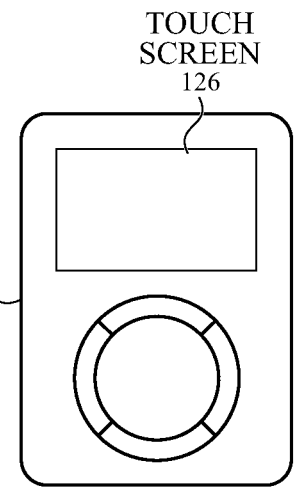
FIG. 1A
FIG. 1B
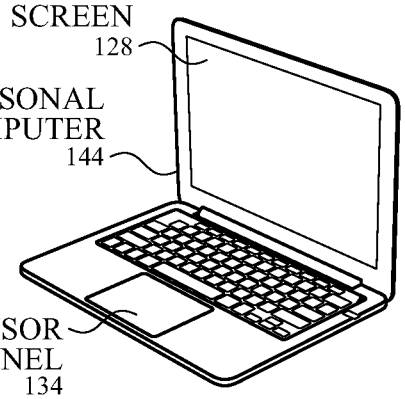
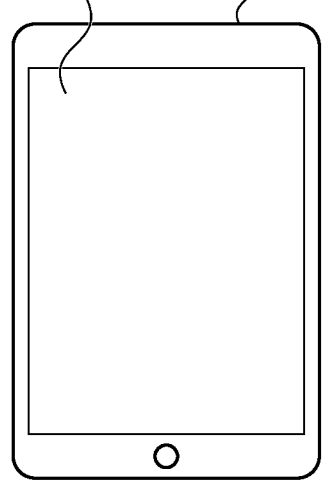
FIG. 1C
FIG. 1D
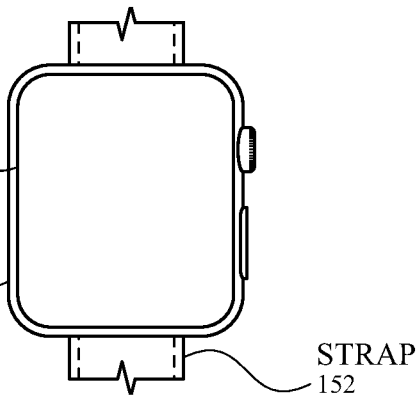
FIG. 1E

TOUCH SCREEN INCLUDING TOUCH ELECTRODES AND DISPLAY CIRCUITRY

CROSS-REFERENCE TO RELATED APPLICATIONS

This application claims the benefit of U.S. Provisional Application No. 63/376,576, filed Sep. 21, 2022, the content of which is herein incorporated by reference in its entirety for all purposes.

FIELD OF THE DISCLOSURE

This relates generally to a touch screen and, more specifically, to a touch screen with touch electrodes orthogonal to conductive portions of display circuitry.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their case and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). In some implementations, due in part to their substantial transparency, some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

In some examples, the touch screen can include touch electrodes and display lines that couple display pixels to display circuitry.

BRIEF SUMMARY OF THE DISCLOSURE

This relates generally to a touch screen and, more specifically, to a touch screen with touch electrodes orthogonal to conductive portions of display circuitry. In some examples, the touch screen can include display lines connecting display pixels to display circuitry. For example, the display lines can include display lines oriented along a first axis (e.g., vertically) and display lines oriented along a second axis (e.g., horizontally) that is orthogonal to the first axis. In some examples, the touch screen can further include touch sense electrodes coupled to touch sensing circuitry. The touch sense electrodes can include touch sense electrodes oriented along the second axis at locations of the display lines oriented along the first axis and touch sense electrodes oriented along the first axis at locations of the display lines oriented along the second axis in some examples. For example, the touch screen can include touch sense electrodes that are orthogonal to the display lines at respective locations of the touch sense electrodes. In some examples, disposing the touch sense electrodes orthogonal to the display lines can facilitate algorithmic reduction and/or removal of noise in the touch data caused by capacitive coupling of display signals carried by the display lines.

BRIEF DESCRIPTION OF THE DRAWINGS

FIGS. 1A-1E illustrate example systems that can use touch electrode techniques according to examples of the disclosure.

DETAILED DESCRIPTION OF THE DISCLOSURE

Figure 2:
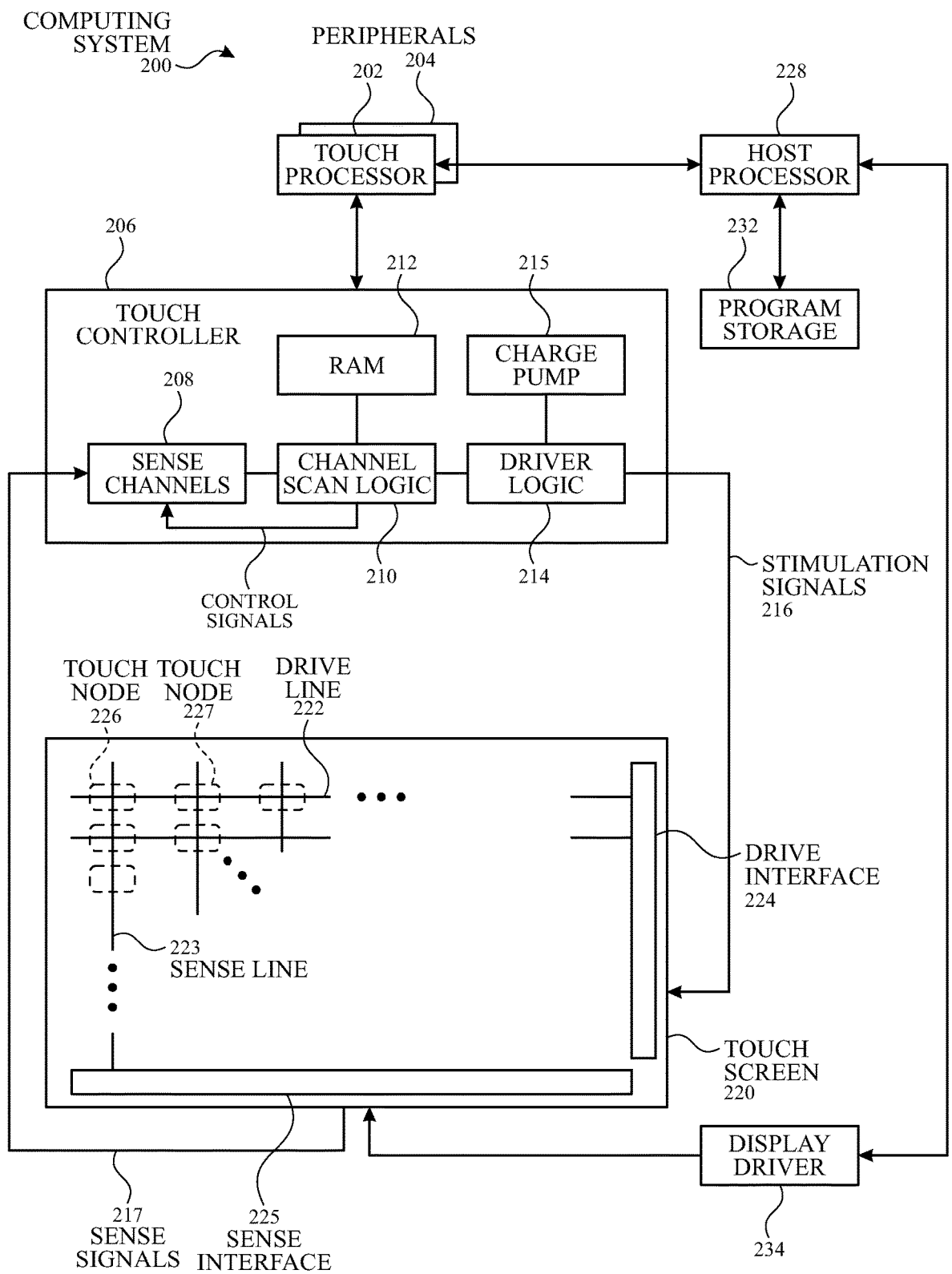
FIG. 2 illustrates an example computing system including a touch screen that can use touch electrode techniques according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to a touch screen and, more specifically, to a touch screen with touch electrodes orthogonal to conductive portions of display circuitry. In some examples, the touch screen can include display lines connecting display pixels to display circuitry. For example, the display lines can include display lines oriented along a first axis (e.g., vertically) and display lines oriented along a second axis (e.g., horizontally) that is orthogonal to the first axis. In some examples, the touch screen can further include touch sense electrodes coupled to touch sensing circuitry. The touch sense electrodes can include touch sense electrodes oriented along the second axis at locations of the display lines oriented along the first axis and touch sense electrodes oriented along the first axis at locations of the display lines oriented along the second axis in some examples. For example, the touch screen can include touch sense electrodes that are orthogonal to the display lines at respective locations of the touch sense electrodes. In some examples, disposing the touch sense electrodes orthogonal to the display lines can facilitate algorithmic reduction and/or removal of noise in the touch data caused by capacitive coupling of display signals carried by the display lines.

FIGS. 1A-1E illustrate example systems that can use touch electrode techniques according to examples of the disclosure. FIG. 1A illustrates an example mobile telephone 136 that includes a touch screen 124 that can use touch electrode techniques according to examples of the disclosure. FIG. 1B illustrates an example digital media player 140 that includes a touch screen 126 that can use touch electrode techniques according to examples of the disclosure. FIG. 1C illustrates an example personal computer 144 that includes a touch screen 128 and a touch sensor panel 134 (e.g., a trackpad) that can use touch electrode techniques according to examples of the disclosure. FIG. 1D illustrates an example tablet computing device 148 that includes a touch screen 130 that can use touch electrode techniques according to examples of the disclosure. FIG. 1E illustrates an example wearable device 150 that includes a touch screen 132 and can be attached to a user using a strap 152 and that can use touch electrode techniques according to examples of the disclosure. It is understood that a touch screen and touch electrode techniques can be implemented in other devices, including future devices not yet in the marketplace. Additionally, it should be understood that although the disclosure herein primarily focuses on touch screens, the disclosure of touch electrode techniques can be implemented for devices including touch sensor panels (and displays) that may not be implemented as a touch screen.

In some examples, touch screens 124, 126, 128, 130 and 132 and touch sensor panel 134 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can support multi-touch, single touch, projection scan, etc., touch functionality.

In some examples, touch screens 124, 126, 128, 130 and 132 and touch sensor panel 134 can be based on mutual capacitance. A mutual capacitance based touch system can include electrodes arranged as drive and sense lines (e.g., as described below with reference to FIG. 4A) that may cross over each other on different layers (in a double-sided configuration) or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 and touch sensor panel 134 can be based on mutual capacitance and/or self-capacitance. The electrodes can be arranged as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation, electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof. In some examples, a touch screen can include a touch sensor panel including touch electrodes and routing connecting the touch electrodes to touch circuitry overlaid on a display that includes display pixels and routing connecting the display pixels to display circuitry.

FIG. 2 illustrates an example computing system including a touch screen that can use touch electrode techniques according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers, co-processor(s) and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may be described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, capturing an image with a camera in communication with the electronic device, exiting an idle/sleep state of the electronic device, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224 and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
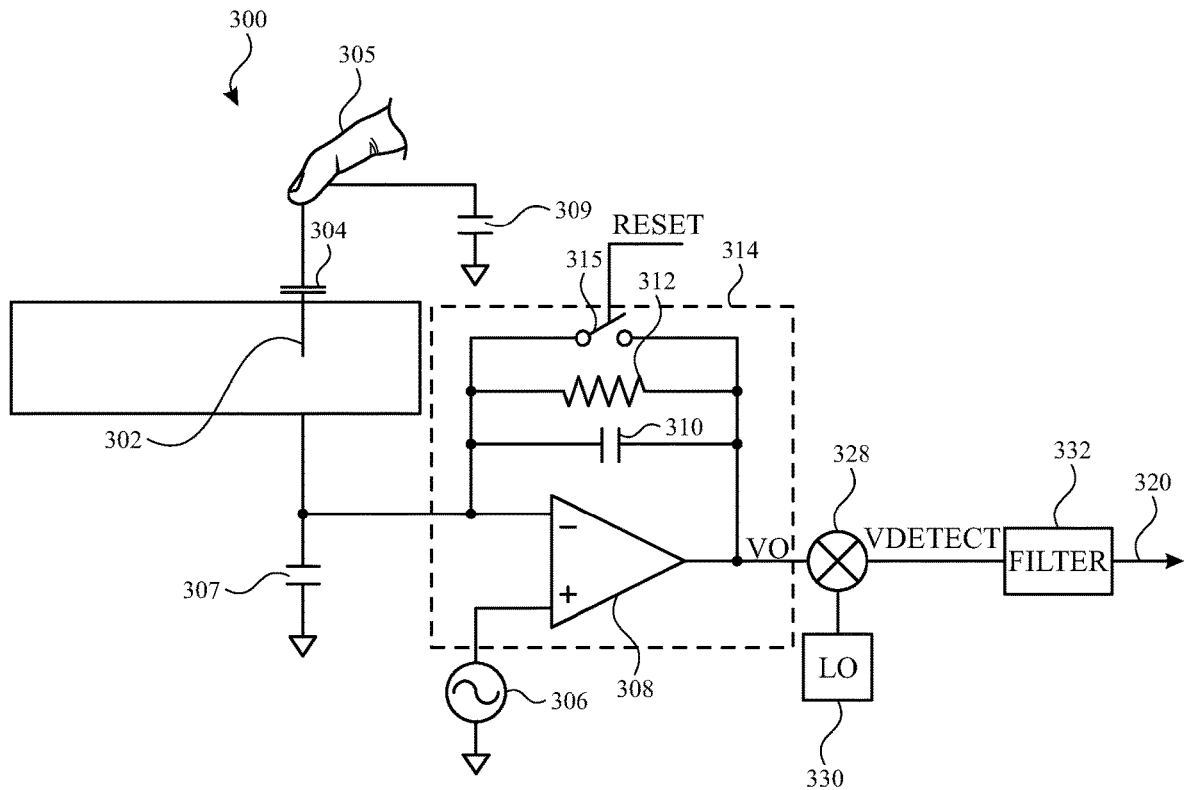
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit corresponding to a self-capacitance measurement of a touch node electrode 302 and sensing circuit 314 (e.g., corresponding to a sense channel 208) according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be approximated as capacitance 304 and can be much smaller than the body capacitance 309 and thus can dominate the overall ground capacitance. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. The output voltage amplitude of amplifier 308 is approximately Vac*(1+XFB/(XCS+XCSNS)), where XFB, XCS and XCSNS are the impedances of the feedback network, capacitances 307 and 304, respectively, at the frequency of Vac. The output of the amplifier 308 can be demodulated at the frequency of stimulus signal Vac (homodyne or synchronous detection) by demodulator 328 and then integrated (or averaged) by filter 332. The resulting output 320 can be used by a processor to determine the presence of a proximity or touch event, or the output can be inputted into a discrete logic network to determine the presence of a proximity or touch event. Note that in some examples, demodulator can be an I/Q demodulator. In some examples, the demodulator can be in the digital domain, where the output of amplifier 308 could be digitized first by an ADC before performing digital demodulation.

Figure 3B:
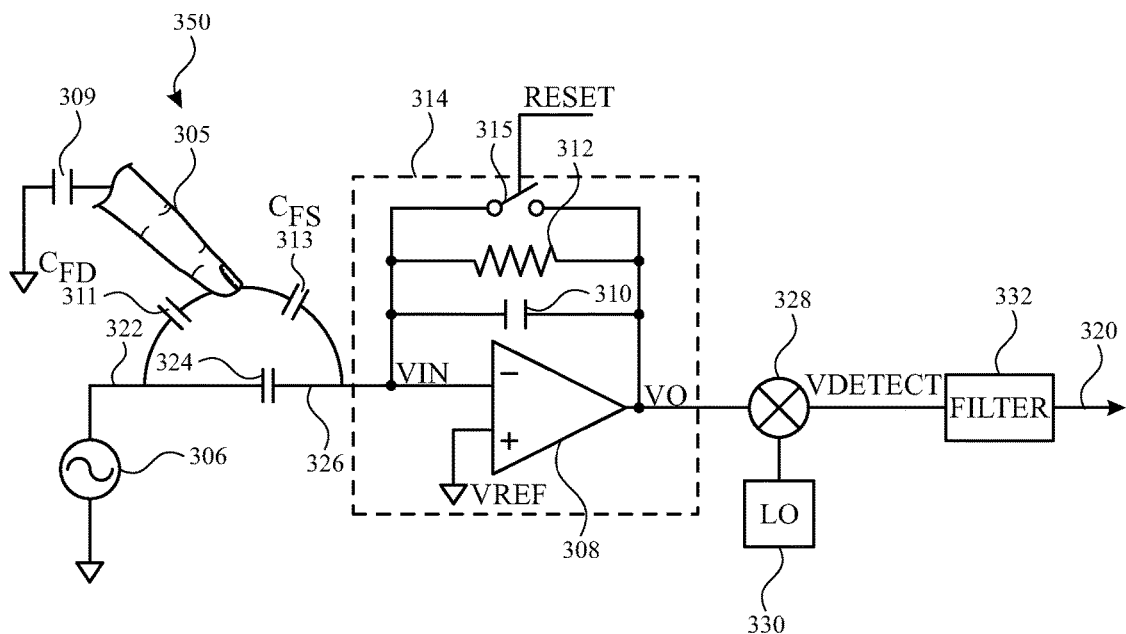
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by AC voltage source 306 (e.g., with an AC voltage signal). AC voltage source 306 can be capacitively coupled to sense line 326 through mutual capacitance 324 between drive line 322 and the sense line. When a finger 305 or object approaches the touch node created by the intersection of drive line 322 and sense line 326, mutual capacitance 324 can change (e.g., decrease) (e.g., due to capacitive coupling indicated by capacitances CFD 311 and CFS 313, which can be formed between drive line 322, finger 305 and sense line 326). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310, and the impedance of mutual capacitance 324. The output of the amplifier 308 is demodulated at the frequency of stimulus signal Vac (homodyne or synchronous detection) by demodulator 328 and then integrated (or averaged) by filter 332. Note that in some examples, demodulator can be an I/Q demodulator. In some examples, the demodulator (or I/Q demodulator) can be in the digital domain, where the output of amplifier 308 can be digitized first by an ADC before performing demodulation and filtering.

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
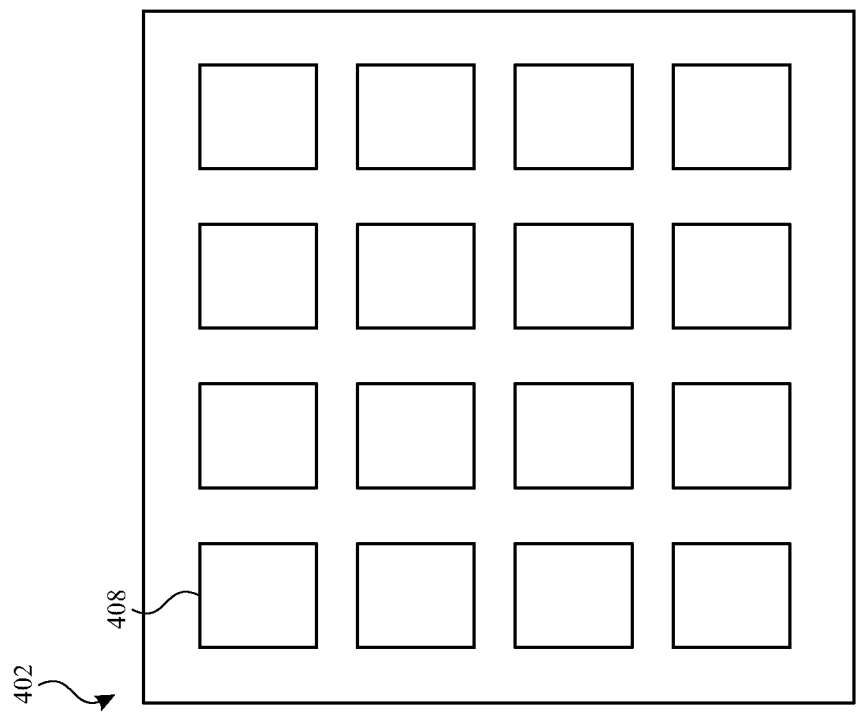
FIG. 4B illustrates touch screen with touch node electrodes arranged in a pixelated touch node electrode configuration according to examples of the disclosure.
Figure 4A:
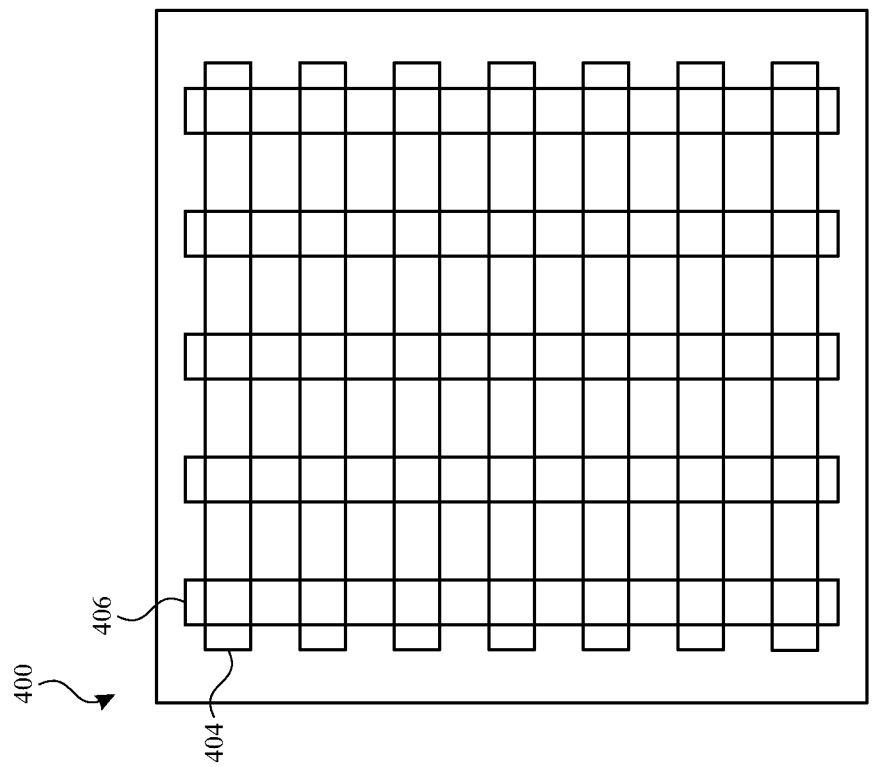
FIG. 4A illustrates touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO and/or metal mesh, though other materials are possible. Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400. Although the touch electrodes 404 and 406 are illustrated as being rectangle-shaped, it should be understood that other electrode shapes and structures (e.g., diamond-, square-, stripe- or circle-shaped electrodes connected by jumpers or vias) are possible.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 402. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402. Although touch node electrodes 408 are illustrated as having rectangular shapes, it should be understood that other electrode shapes (e.g., diamonds, circles, stripes etc.) and structures are possible.

Figure 5:
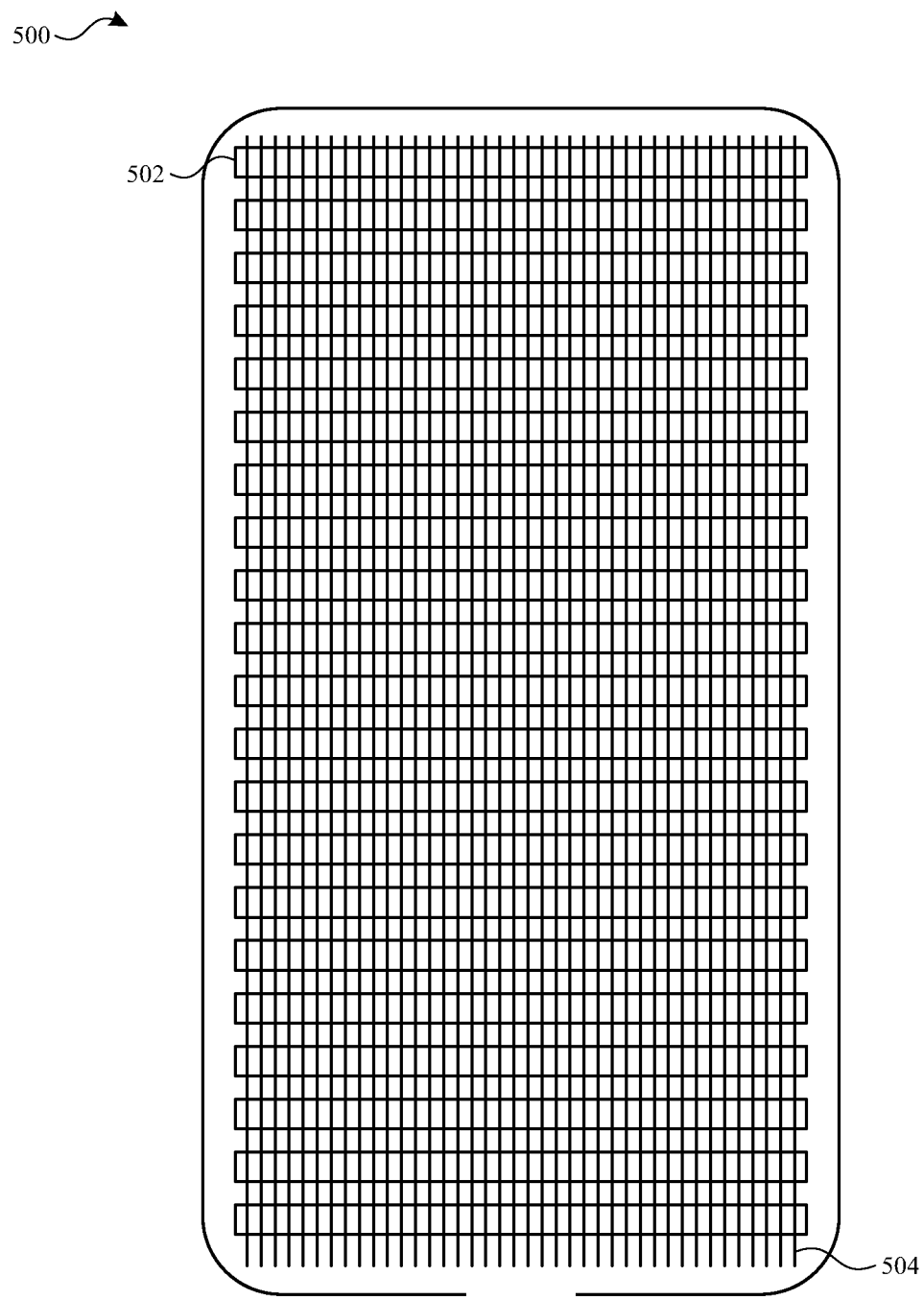
FIG. 5 illustrates an example touch screen including touch sense electrodes and display lines according to examples of the disclosure.

FIG. 5 illustrates an example touch screen 500 including touch sense electrodes 502 and display lines 504 according to examples of the disclosure. In some examples, the touch screen 500 further includes touch drive electrodes (not shown) orthogonal to the touch sense electrodes 502 in an arrangement similar to the touch screen 400 in FIG. 4A. As shown in FIG. 5, the touch sense electrodes 502 can be orthogonal to the display lines 504. In some examples, the touch sense electrodes 502 are included in a touch sensor panel of the touch screen. In some examples, the display lines 504 are included in a display of the touch screen. In some examples, the touch sense electrodes 502 and display lines 504 are included in an integrated touch screen. In some examples, arranging the touch sense electrodes 502 orthogonal to the display lines 504 can facilitate algorithmic reduction and/or removal of noise in the touch data caused by display data signals transmitted using the display lines 504 and capacitively coupled to the touch sense electrodes 502 (e.g., "display-to-touch" noise or "display-to-touch" crosstalk). In some examples, the touch sense electrodes 502 can be coupled to touch circuitry via touch sense lines. In some examples, the display lines 504 can couple display pixels to display circuitry.

Although the display lines 504 are herein referred to as "lines," it should be understood that, in some examples, the display lines 504 are not disposed in straight lines. For example, "display lines" can refer to conductive components that couple display electrodes to display circuitry to transmit signals to the display components in the display area of the touch screen. For example, "display lines" can transmit display signals and/or common voltage or ground signals to anodes and/or cathodes of display pixels. In some examples, "display lines" can be disposed in a variety of shapes including straight conductive components, curved conductive components, and/or conductive components with corners and/or turns.

Figure 6A:
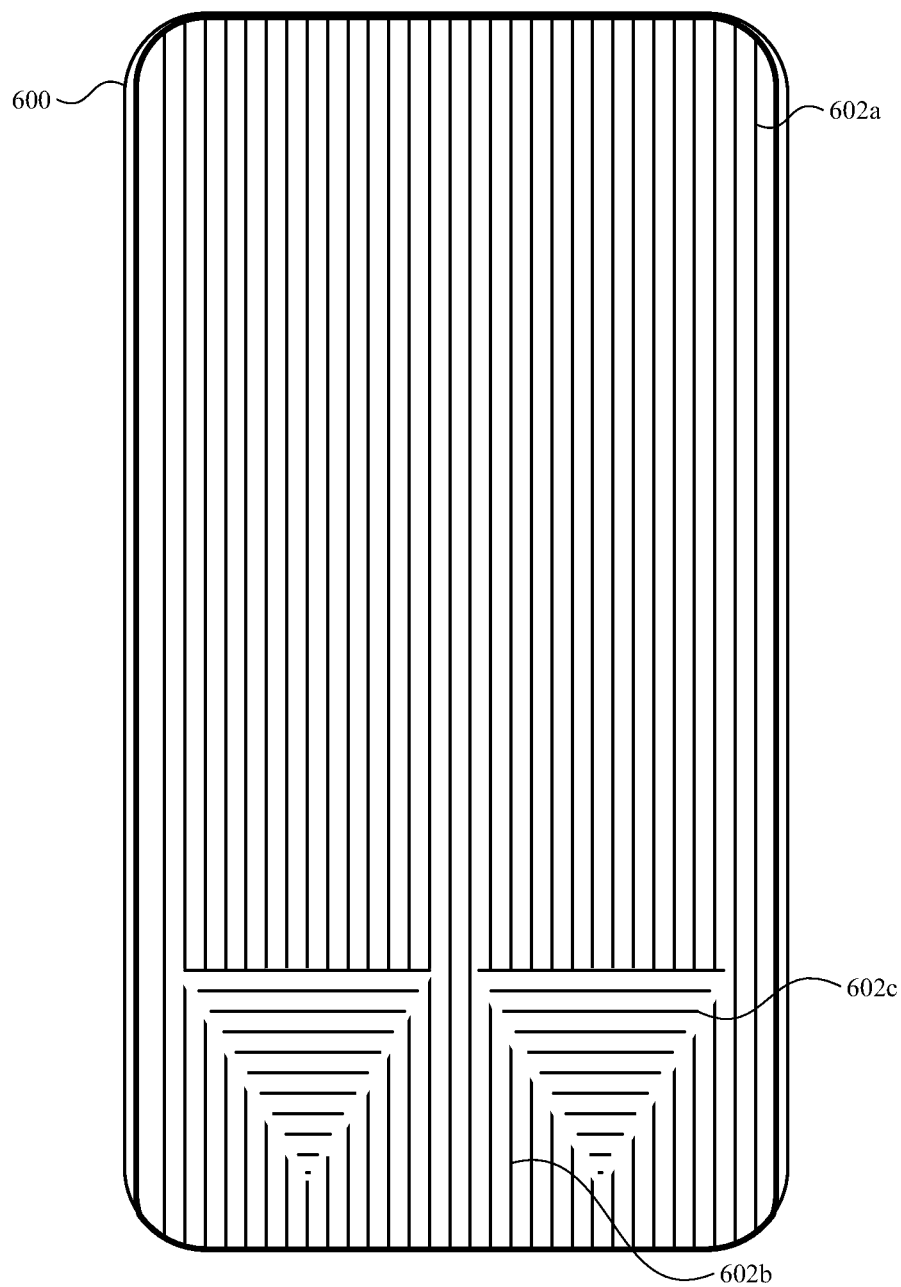
FIG. 6A illustrates an example touch screen with display lines according to examples of the disclosure.

FIG. 6A illustrates an example touch screen 600 with display lines 602a, 602b, and 602c according to examples of the disclosure. In some examples, touch screen 600 can include additional components not shown in FIG. 6A, such as drive touch electrodes, sense touch electrodes, touch lines, and/or display pixels. As described above with reference to FIG. 5, in some examples, the display lines 602a, 602b, and 602c can be conductive pathways that couple display pixel circuitry to other display circuitry. In some examples, the display lines 602a, 602b, and 602c are included in a display of the touch screen. In some examples, the display lines 602a. 602b, and 602c are included in an integrated touch screen.

In some examples, the touch screen 600 includes display lines 602a disposed along a first axis (e.g., vertical axis). For example, display lines 602a can be disposed along the same axis as the display lines 504 in FIG. 5. In some examples, the display lines 602 can couple one or more pixels at locations intersecting the display lines 602a to display circuitry.

In some examples, the touch screen 600 further includes display lines 602c disposed along a second axis (e.g., horizontal axis) that is orthogonal to the first axis along which display lines 602a are disposed. In some examples, display lines 602c can couple one or more pixels at locations intersecting the display lines 602c to display circuitry. In some examples, display lines 602c can be disposed in a different material layer than display lines 602a. In some examples, one or more of display lines 602c can be coupled to one or more of display lines 602a using vias.

In some examples, the touch screen 600 further includes display lines 602b disposed along the first axis (e.g., vertical axis) that is the same as the vertical axis along which display lines 602a are disposed. In some examples, display lines 602b can couple one or more pixels at locations intersecting the display lines 602b to display circuitry. In some examples, display lines 602b can be disposed in a different material layer than display lines 602a. In some examples, display lines 602b and display lines 602c are disposed in the same material layer. In some examples, display lines 602b are the display lines disposed between groups of display lines 602c.

As described above with reference to FIG. 5, in some examples, it can be advantageous for the display lines to be arranged orthogonal to the touch sense electrodes. If the touch sense electrodes included in touch screen 600 were all disposed horizontally, as was the case for touch screen 500, then portions of the touch screen 600 including display lines 602c would have display lines 602c parallel to the touch sense electrodes, instead of the display lines being disposed orthogonal to the touch sense electrodes. In some examples, the touch screen 600 can include portions of touch sense electrodes rotated to be disposed vertically so that the touch sense electrodes can be orthogonal to the portions of the display lines 602c that are disposed horizontally, as shown in FIG. 6B.

Figure 6B:
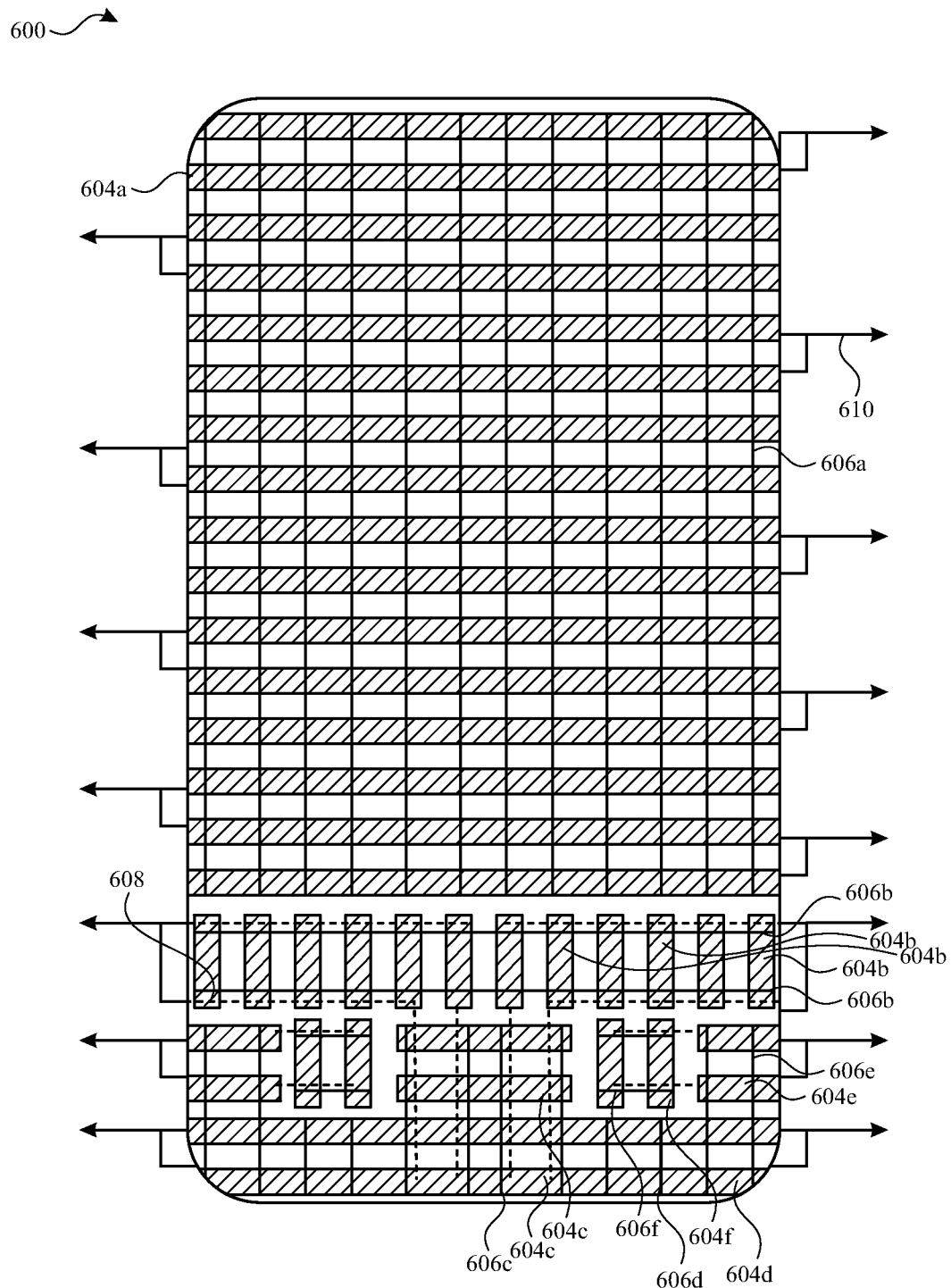
FIG. 6B illustrates example touch sense electrodes and example drive electrodes of touch screen according to examples of the disclosure.

FIG. 6B illustrates example touch sense electrodes 604a through 604f and example drive electrodes 606a through 606f of touch screen 600 according to examples of the disclosure. In some examples, touch screen 600 can further include the display lines 602a through 602c illustrated in FIG. 6A. In some examples, the touch sense electrodes 604a through 604f and drive electrodes 606a through 606f are included in a touch sensor panel of the touch screen 600. In some examples, the touch sense electrodes 604a through 604f and drive electrodes 606a through 606f are included in an integrated touch screen.

In some examples, touch screen 600 can include horizontally-oriented touch sense electrodes 604a, 604c, 604d, and 604e. For example, the horizontally-oriented sense electrodes 604a, 604c, 604d, and 604e can be disposed in portions of the touch screen 600 that superimpose vertically-oriented display lines 602a and/or 602b. In some examples, the touch screen 600 includes vertically-oriented touch drive lines 606a, 606c, 606d, and 606e at the locations of the horizontally-oriented touch sense electrodes 604a, 606c, 604d, and 604c.

In some examples, touch screen 600 can include vertically-oriented touch sense electrodes 604b and 604f. For example, the vertically-oriented sense electrodes 604b and 604f can be disposed in portions of the touch screen 600 that superimpose horizontally-oriented display lines 602c. In some examples, the touch screen 600 includes horizontally-oriented touch drive lines 606b and 606f at the locations of the horizontally-oriented touch sense electrodes 604b and 604f. The arrangement of the touch sense electrodes 604a through 604f and touch drive electrodes 606a through 606f and the arrangement of display lines 602a through 602c can be combined so that touch screen 600 includes touch sense electrodes that are orthogonal to the display lines, for example.

In some examples, portions of touch sense electrodes 604b can be coupled together by connections 608. For example, as shown in FIG. 6B, horizontally-adjacent vertical touch sense electrodes 604b can be coupled together and coupled to horizontal touch sense electrodes 604c. In some examples, although portions of vertical drive electrodes 606b can be coupled to horizontally-adjacent vertical drive electrodes 606b, because the drive electrodes are disposed vertically, they can be referred to as "vertical drive electrodes." In some examples, coupling touch sense electrodes 604b and 604c can create bent touch sense electrodes that can be orthogonal to the display lines at the locations of the bent touch sense electrodes. In some examples, horizontal touch drive electrodes 606b can be disposed at locations of vertical touch sense electrodes 604b and vertical touch drive electrodes 606c can be disposed at locations of horizontal touch sense electrodes 604c. In some examples, horizontal touch sense electrodes 604e can be coupled to vertical touch sense electrodes 604f disposed horizontally from the touch sense electrodes 604e. In some examples, vertical touch drive electrodes 606e can be disposed at locations of horizontal touch sense electrodes 604e and horizontal touch drive electrodes 606f can be disposed at locations of vertical touch sense electrodes 604f.

In some examples, the touch sense electrodes can be arranged differently from the arrangement illustrated in FIG. 6B without departing from the scope of the disclosure. In some examples, the touch screen 600 can include touch sense electrodes disposed diagonally instead of or in addition to the touch sense electrodes disposed vertically and horizontally. For example, a touch screen 600 can include diagonal touch electrodes, horizontal touch electrodes, and/or vertical touch electrodes. In some examples, the touch screen 600 can include diagonal touch electrodes disposed at multiple different angles. In some examples, the touch sense electrodes disposed with various orientations can be orthogonal to the display lines of the touch screen.

Although FIGS. 6A-6B illustrate example arrangements of touch electrodes and sense lines with particular portions oriented vertically and/or horizontally, in some examples, portions of the touch screen 600 in FIGS. 6A-6B illustrated with vertically-oriented touch electrodes or sense lines may include horizontally-oriented touch electrodes or sense lines without departing from the scope of the disclosure. Moreover, in some examples, portions of the touch screen 600 in FIGS. 6A-6B illustrated with horizontally-oriented touch electrodes or sense lines may include vertically-oriented touch electrodes or sense lines without departing from the scope of the disclosure.

Some examples are directed to a touch sensor panel. In some examples, the touch sensor panel includes a first set of touch sense electrodes having at least a portion oriented along a first axis and arranged to be superimposed over a first portion of a display line. In some examples, the touch sensor panel includes a second set of touch sense electrodes having at least a portion oriented in along a second axis different from the first axis and arranged to be superimposed over a second portion of the display line. In some examples, the first set of touch sense electrodes is arranged to be orthogonal to the first portion of the display line. In some examples, the second set of touch sense electrodes is arranged to be orthogonal to the second portion of the display line. In some examples, the touch sensor panel includes a first set of touch drive electrodes oriented along the second axis. In some examples, the touch sensor panel includes a second set of touch drive electrodes oriented along the first axis. In some examples, the first set of touch drive electrodes overlap the first set of touch sense electrodes. In some examples, the second set of touch drive electrodes overlap the second set of touch sense electrodes. In some examples, a cross-section of the touch sensor panel oriented along the first axis includes at least one of the first set of touch electrodes and at least one of the second set of touch electrodes. In some examples, a cross-section of the touch sensor panel oriented along the second axis includes at least one of the first set of touch electrodes and at least one of the second set of touch electrodes. In some examples, a cross-section of the touch sensor panel oriented along the first axis includes at least a first one of the first set of touch electrodes and at least a first one of the second set of touch electrodes. In some examples, a cross-section of the touch sensor panel oriented along the second axis includes at least a second one of the first set of touch electrodes and at least a second one of the second set of touch electrodes. In some examples, the touch sensor panel further includes a third set of touch sense electrodes having at least a first portion oriented along the first axis and a second portion oriented along the second axis. In some examples, the third set of touch sense electrodes includes a respective touch sense electrode with the second portion oriented along the second axis including a plurality of touch sense electrode segments oriented along the second axis coupled together and adjacent to one another along the first axis. In some examples, the third set of touch sense electrodes includes a respective touch sense electrode with the first portion oriented along the first axis including a plurality of touch sense electrode segments oriented along the first axis coupled together and adjacent to one another along the second axis. In some examples, the third set of touch sense electrodes includes a respective touch sense electrodes with the second portion oriented along the second axis including a plurality of touch sense electrode segments oriented along the second axis coupled together and adjacent to one another along the first axis, and the first portion oriented along the first axis including a plurality of touch sense electrode segments oriented along the first axis coupled together and adjacent to one another along the second axis. In some examples, the first axis and second axis are orthogonal to each other.

Some examples are directed to an electronic device. In some examples, the electronic device includes touch sense circuitry. In some examples, the electronic device includes display circuitry. In some examples, the electronic device includes a display comprising a display line coupled to the display circuitry. In some examples, the display line includes a first portion oriented along a first axis. In some examples, the display line includes a second portion oriented along a second axis different from the first axis. In some examples, the electronic device includes a touch sensor panel. In some examples, the touch sensor panel includes a first set of touch sense electrodes coupled to the touch sense circuitry and having at least a first portion superimposed over a first portion of the display line and oriented orthogonal to the first axis. In some examples, the touch sensor panel includes a second set of touch sense electrodes coupled to the touch sense circuitry and having at least a second portion superimposed over a second portion of the display line and oriented orthogonal to the second axis. In some examples, the touch sensor panel includes a first set of touch drive electrodes oriented along the second axis. In some examples, the touch sensor panel includes a second set of touch drive electrodes oriented along the first axis. In some examples, the first set of touch drive electrodes overlap the first set of touch sense electrodes. In some examples, the second set of touch drive electrodes overlap the second set of touch sense electrodes. In some examples, a cross-section of the touch sensor panel oriented along the first axis includes at least one of the first set of touch electrodes and at least one of the second set of touch electrodes. In some examples, a cross-section of the touch sensor panel oriented along the second axis includes at least one of the first set of touch electrodes and at least one of the second set of touch electrodes. In some examples, a cross-section of the touch sensor panel oriented along the first axis includes at least a first one of the first set of touch electrodes and at least a first one of the second set of touch electrodes. In some examples, a cross-section of the touch sensor panel oriented along the second axis includes at least a second one of the first set of touch electrodes and at least a second one of the second set of touch electrodes. In some examples, the touch sensor panel further includes a third set of touch sense electrodes having at least a first portion oriented along the first axis and a second portion oriented along the second axis. In some examples, the third set of touch sense electrodes includes a respective touch sense electrode with the second portion oriented along the second axis including a plurality of touch sense electrode segments oriented along the second axis coupled together and adjacent to one another along the first axis. In some examples, the third set of touch sense electrodes includes a respective touch sense electrode with the first portion oriented along the first axis including a plurality of touch sense electrode segments oriented along the first axis coupled together and adjacent to one another along the second axis. In some examples, the third set of touch sense electrodes includes a respective touch sense electrodes with the second portion oriented along the second axis including a plurality of touch sense electrode segments oriented along the second axis coupled together and adjacent to one another along the first axis, and the first portion oriented along the first axis including a plurality of touch sense electrode segments oriented along the first axis coupled together and adjacent to one another along the second axis. In some examples, the first axis and second axis are orthogonal to each other.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A touch sensor panel comprising:
   a first set of touch sense electrodes having at least a portion oriented along a first axis and arranged to be superimposed over a first portion of a display line; and
   a second set of touch sense electrodes having at least a portion oriented in along a second axis different from the first axis and arranged to be superimposed over a second portion of the display line, wherein:
   the first set of touch sense electrodes is arranged to be orthogonal to the first portion of the display line; and
   the second set of touch sense electrodes is arranged to be orthogonal to the second portion of the display line.

2. The touch sensor panel of claim 1, further comprising:
   a first set of touch drive electrodes oriented along the second axis; and
   a second set of touch drive electrodes oriented along the first axis, wherein:
   the first set of touch drive electrodes overlap the first set of touch sense electrodes, and
   the second set of touch drive electrodes overlap the second set of touch sense electrodes.

3. The touch sensor panel of claim 1, wherein a cross-section of the touch sensor panel oriented along the first axis includes at least one of the first set of touch electrodes and at least one of the second set of touch electrodes.

4. The touch sensor panel of claim 1, wherein a cross-section of the touch sensor panel oriented along the second axis includes at least one of the first set of touch electrodes and at least one of the second set of touch electrodes.

5. The touch sensor panel of claim 1, wherein:
   a cross-section of the touch sensor panel oriented along the first axis includes at least a first one of the first set of touch electrodes and at least a first one of the second set of touch electrodes, and
   a cross-section of the touch sensor panel oriented along the second axis includes at least a second one of the first set of touch electrodes and at least a second one of the second set of touch electrodes.

6. The touch sensor panel of claim 1, further comprising a third set of touch sense electrodes having at least a first portion oriented along the first axis and a second portion oriented along the second axis.

7. The touch sensor panel of claim 6, wherein the third set of touch sense electrodes includes a respective touch sense electrode with the second portion oriented along the second axis including a plurality of touch sense electrode segments oriented along the second axis coupled together and adjacent to one another along the first axis.

8. The touch sensor panel of claim 6, wherein the third set of touch sense electrodes includes a respective touch sense electrode with the first portion oriented along the first axis including a plurality of touch sense electrode segments oriented along the first axis coupled together and adjacent to one another along the second axis.

9. The touch sensor panel of claim 6, wherein the third set of touch sense electrodes includes a respective touch sense electrodes with the second portion oriented along the second axis including a plurality of touch sense electrode segments oriented along the second axis coupled together and adjacent to one another along the first axis, and the first portion oriented along the first axis including a plurality of touch sense electrode segments oriented along the first axis coupled together and adjacent to one another along the second axis.

10. The touch sensor panel of claim 1, wherein the first axis and second axis are orthogonal to each other.

11. An electronic device comprising:
touch sense circuitry;
display circuitry;
a display comprising a display line coupled to the display circuitry, the display line comprising:
a first portion oriented along a first axis; and
a second portion oriented along a second axis different from the first axis; and
a touch sensor panel comprising:
a first set of touch sense electrodes coupled to the touch sense circuitry and having at least a first portion superimposed over a first portion of the display line and oriented orthogonal to the first axis;
a second set of touch sense electrodes coupled to the touch sense circuitry and having at least a second portion superimposed over a second portion of the display line and oriented orthogonal to the second axis.

12. The electronic device of claim 11, wherein the touch sensor panel further comprises:
a first set of touch drive electrodes oriented along the second axis; and
a second set of touch drive electrodes oriented along the first axis, wherein:
the first set of touch drive electrodes overlap the first set of touch sense electrodes, and
the second set of touch drive electrodes overlap the second set of touch sense electrodes.

13. The electronic device of claim 11, wherein a cross-section of the touch sensor panel oriented along the first axis includes at least one of the first set of touch electrodes and at least one of the second set of touch electrodes.

14. The electronic device of claim 11, wherein a cross-section of the touch sensor panel oriented along the second axis includes at least one of the first set of touch electrodes and at least one of the second set of touch electrodes.

15. The electronic device of claim 11, wherein:
a cross-section of the touch sensor panel oriented along the first axis includes at least a first one of the first set of touch electrodes and at least a first one of the second set of touch electrodes, and
a cross-section of the touch sensor panel oriented along the second axis includes at least a second one of the first set of touch electrodes and at least a second one of the second set of touch electrodes.

16. The electronic device of claim 11, wherein the touch sensor panel further comprises a third set of touch sense electrodes having at least a first portion oriented along the first axis and a second portion oriented along the second axis.

17. The electronic device of claim 16, wherein the third set of touch sense electrodes includes a respective touch sense electrode with the second portion oriented along the second axis including a plurality of touch sense electrode segments oriented along the second axis coupled together and adjacent to one another along the first axis.

18. The electronic device of claim 16, wherein the third set of touch sense electrodes includes a respective touch sense electrode with the first portion oriented along the first axis including a plurality of touch sense electrode segments oriented along the first axis coupled together and adjacent to one another along the second axis.

19. The electronic device of claim 16, wherein the third set of touch sense electrodes includes a respective touch sense electrodes with the second portion oriented along the second axis including a plurality of touch sense electrode segments oriented along the second axis coupled together and adjacent to one another along the first axis, and the first portion oriented along the first axis including a plurality of touch sense electrode segments oriented along the first axis coupled together and adjacent to one another along the second axis.

20. The electronic device of claim 11, wherein the first axis and second axis are orthogonal to each other.

* * * * *